United States Patent [19]

Johansson

[11] Patent Number: 4,715,322

[45] Date of Patent: Dec. 29, 1987

[54] METHOD AND MEANS FOR KEEPING CATTLE IN A STALL BARN

[76] Inventor: Kjell Johansson, Ökne Gård 1011, S-660 30 Värmlands Nysäter, Sweden

[21] Appl. No.: 881,932

[22] Filed: Jul. 3, 1986

[51] Int. Cl.⁴ ............................................ A01K 29/00
[52] U.S. Cl. ................................................... 119/27
[58] Field of Search ........................ 119/27, 14.03, 155

[56] References Cited

U.S. PATENT DOCUMENTS

| | | | |
|---|---|---|---|
| 3,734,059 | 5/1973 | Rodrigues | 119/27 |
| 4,136,641 | 1/1979 | Hoffman | 119/155 |
| 4,552,096 | 11/1985 | Forrest | 119/155 |
| 4,567,851 | 2/1986 | Larsen | 119/27 |
| 4,590,886 | 5/1986 | Brashear | 119/27 |

FOREIGN PATENT DOCUMENTS

| | | |
|---|---|---|
| 1482345 | 3/1969 | Fed. Rep. of Germany ........ 119/27 |
| 3218380 | 11/1983 | Fed. Rep. of Germany . |

Primary Examiner—William F. Pate, III
Assistant Examiner—Creighton H. Smith

[57] ABSTRACT

A method and means for keeping cattle in a stall barn is provided. The barn has feeding and resting places where each animal is kept during feeding and rest in a separate stall defined by vertical parallel side stall partitions, the animals being free from restraining connections to the feeding table and said partitions and being confined at the rear of the stall by a closing means controlled by power transmissions means which lifts it to a level above the standing height of the animals to allow them to back out from their individual stalls and move to a common collecting place along a predetermined route of a way system, the animals being subsequently returned to their stalls by the same or a different route, and the closing means being returned to confining position behind the animals, said routes being established by a plurality of adjustable gates within said way system, the gates being set in different positions by individual power transmission means. The animals are divided into a plurality of individual groups having a small number of animals in each group, the groups being distributed along said feeding and resting places, said power transmission means for both the closing means and the gates being automatically controlled by control means of a common control station. Said control means is permitted to actuate the power transmission means for the closing means in a predetermined sequence depending on the particular group of animals being selected and at the same time actuate the power transmission means for those gates which are to be set to establish said predetermined route for the group selected when this is to be moved to or from said collecting place.

12 Claims, 3 Drawing Figures

METHOD AND MEANS FOR KEEPING CATTLE IN A STALL BARN

BACKGROUND OF THE INVENTION

The present invention relates to a method of keeping cattle in a stall barn and also to a means which is useful in carrying out the method.

To achieve highly rational operation in milk production, all parts of the system upon which the operation is based must function in a satisfactory manner. One weak link in this system has been the design of stall fittings for feeding and resting places in which the animals are free from restraint at the neck and can move freely backwards when a rear closing means is removed.

No. DE-A1-32 18 380 and U.S. Pat. No. 3,166,044 describe rear closing means in the form of rotatably mounted gates. Similar and other closing arrangements are described in the examination work "Feeding and resting places" by Gunnar Israelsson and Perarne Mattson, the Swedish Agricultural University (Uppsala 1979). These known arrangements use tube or bar constructions. Such rigid and stiff bar constructions cause considerable strain onto the attachment points of the gates when the animals come into contact with the stall gates. This may damage the stall gates, their attachment points and parts of the journalling and manoeuvre means, thus impairing the opening function so that the animal is confined in its stall when adjacent animals are let out. Due to the cow's ingrained group-dependence she may then behave in a manner causing further damage to the stiff stall gate. Another problem is that the cows excrete on the stiff stall gates thus soiling them.

The primary object of the present invention is therefore to provide an improved method and means for keeping cattle in a stall barn.

Another object of the invention is to achieve improved stall fittings having closing means which eliminate the problems mentioned above thus paving the way for highly rational milk production in keeping cattle in a stall barn having feeding and resting places and a milking parlor located at a distance therefrom.

SUMMARY OF THE INVENTION

The invention relates to a method of keeping cattle in a stall barn having feeding and resting places where each animal is kept during feeding and rest in a separate stall defined by vertical parallel side stall partitions, the animals being free from restraining connections to the feeding table and said partitions and being confined at the rear of the stall by a closing means controlled by power transmissions means which lifts it to a level above the standing height of the animals to allow them to back out from their individual stalls and move to a common collecting place, such as a milking parlor and exercising pen, along a predetermined route of a way system, the animals being subsequently returned to their stalls by the same or a different route, and the closing means being returned to confining position behind the animals, said routes being established and determined by means of a plurality of adjustable gates within said way system, the gates being set in different predetermined positions by individual power transmission means, said animals being divided into a plurality of individual groups having a small number of animals in each group, the groups being distributed along said feeding and resting places, said power transmission means for both the closing means and the gates being automatically controlled by control means of a common control station, and permitting said control means to actuate the power transmission means for the closing means in a predetermined sequence depending on the particular group of animals being selected and at the same time actuate the power transmission means for those gates which are to be set to establish said predetermined route for the group selected when this is to be moved to or from said collecting place so that routes intended for other traffic or for other groups of animals are blocked by the gates.

The invention also relates to a means for keeping cattle in a stall barn having feeding and resting places where each animal is kept during feeding and rest in a separate stall defined by vertical parallel side stall partitions, said animals being divided into a plurality of individual groups having a small number of animals in each group, the groups being distributed along said feeding and resting places, said means comprising closing means for confining the animals in their stalls and controlled by power transmissions means, and gates and power transmission means for said gates in order to establish predetermined routes of a way system for the animals to and from a specific collecting place at a distance from said feeding and resting places, such as a milking parlor and exercising pen, said closing means being mounted at the rear of the stalls behind each animal within each group, the closing means for each group being arranged to be raised and lowered simultaneously by an individual power transmission means, and a common control station having control means for automatically controlling the power transmission means for said gates and closing means, said control means being mounted to actuate the power transmission means for the closing means in a predetermined sequence depending on the group of animals selected, and at the same time actuating the power transmission means for the gates to be set in order to establish a predetermined route of said way system for the group selected, when this is to be moved to or from said collecting place, so that routes of said way system intended for other traffic or for the other groups of animals are blocked by the gates.

DESCRIPTION OF THE DRAWINGS

The invention will be described further in the following detailed description with reference to the accompanying drawings in which.

DETAILED DESCRIPTION OF THE PREFERRED EMBODIMENTS

Figure 1:
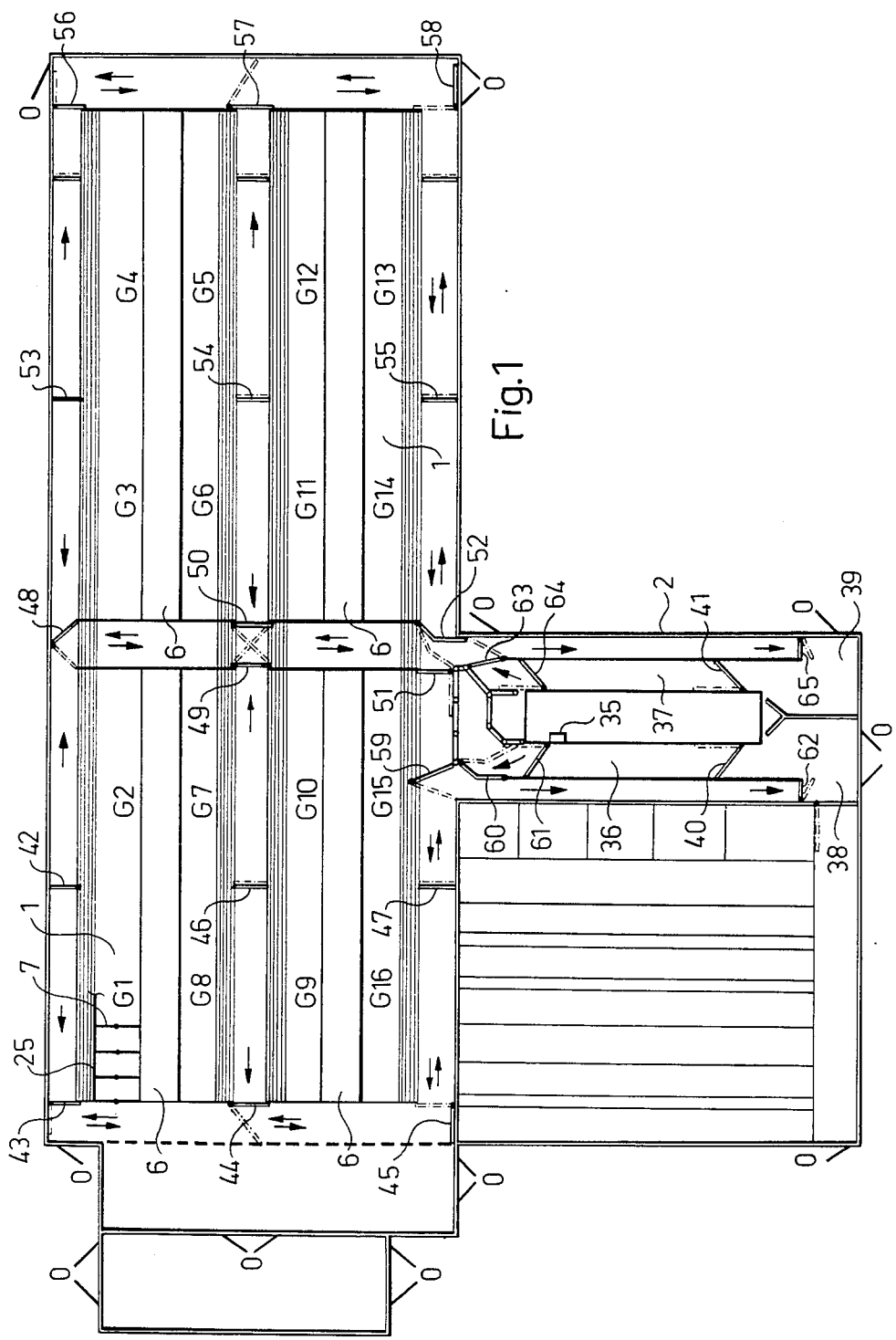
FIG. 1 shows schematically a plan of a stall barn having feeding and resting places and a separate milking parlor.
Figure 2:
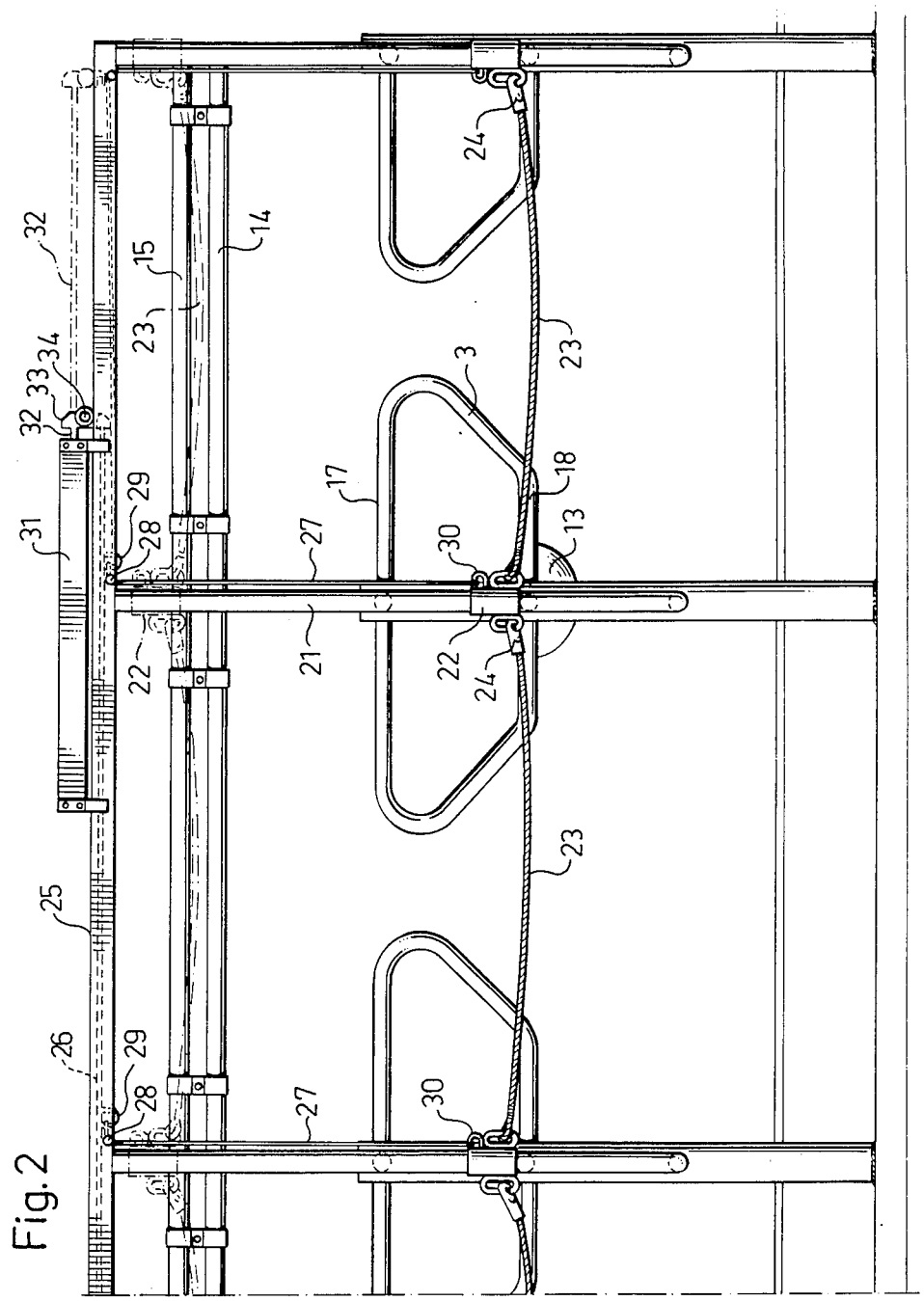
FIG. 2 shows stall fittings seen from the rear towards the feeding table and having parts of a means according to the invention for use in a stall barn according to FIG. 1.
Figure 3:
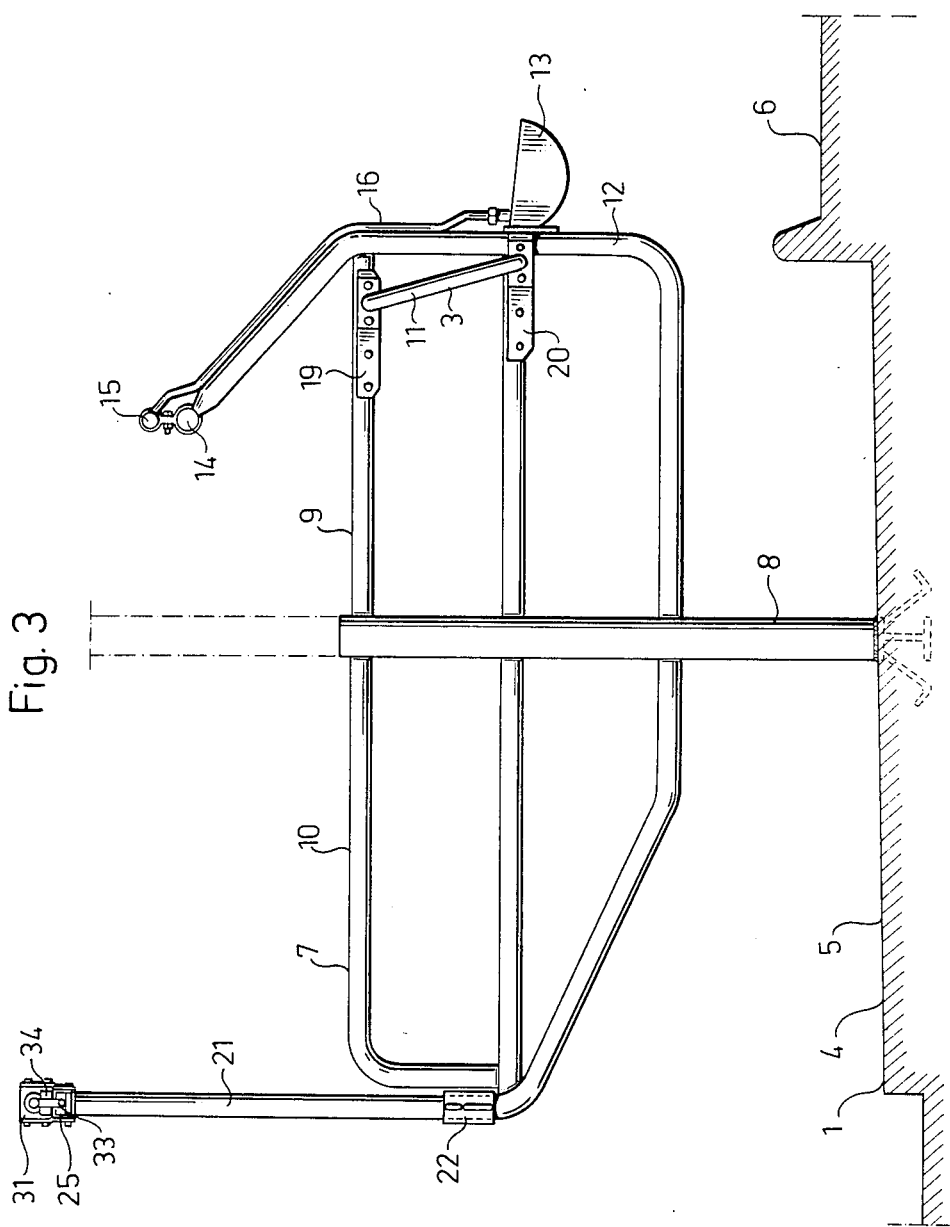
FIG. 3 shows the stall fittings from one side.

With reference to FIG. 1, it shows a stall barn for dairy cows which are divided into several groups designated from G1 to G16. Each group of cows has its own feeding and resting place 1 and is guided to a collecting place in the form of a milking parlor 2 in the vicinity or an exercise yard outside the stall barn along a predetermined route of a way system. This system of grouping and guiding the animals in both directions requires special automatically controlled arrangements at, among other things, the feeding and resting place 1 of each group, ensuring that the animals of the group remain in their place 1 during rest and feeding and that they leave it together to be guided to the milking parlor or some other collecting place as is intended. Such an arrangement is illustrated in FIGS. 2 and 3 and comprises a special means for confining the cows of a group in their respective stalls 4 and then, when desired, permitting simultaneously or substantially simultaneously release of the cows in this group from their stalls 4, usually in connection with milking and exercise. The number of cows in each group may vary and is preferably in the range of 4 to 20 and aost preferred 8 to 12.

Said means is included in the stall fittings provided within the feeding and resting place 1 adjacent a feeding table 6 and comprising vertical parallel side stall partitions 7 arranged to give each animal its own separate stall 4. Each partition comprises a vertical support post 8 firmly anchored in the stall floor 5 at an essential distance from the feeding table 6, preferably substantially at the middle of the stall floor 5. This post 8 forms the only connection or attachment to the foundation which includes both the stall floor 5 and the feeding table 6. This gives the animal a considerable amount of freedom. It also reduces problem of corrosion since the single attachment point usually remains dry. Some of the posts, e.g. alternate posts, may be extended to provide roof support and to stabilize the stall fittings general ly. The posts 8 are suitably filled with concrete to further increase service life and durability.

With respect to the post 8 each side stall partition thus comprises a forward bar section 9 and a rear bar section 10, in line with each other and welded to the post 8. The forward bar section is provided with a shoulder support 11 or the like having no communication with the foundation. A forward restraining device such as the shoulder support 11 gives the animal greater freedom at the front limit of the stall. The shoulder support 11 is in the form of a horizontal U-tube, the connecting piece 3 being inclined downwardly and inwardly from the central plane of the stall. The shanks 17, 18 of the U-tube are detachably secured to the front bar section 9, the U-tube being inclined forwards-downwards. The connecting piece 3 and the entire shoulder support being inclined in the manner described enable it to fit better to the shape of the animal, causing less rubbing on the animal and facilitating movement of the animal when it wishes to lie down or get up. The shoulder support is adjustable enabling it to be set as desired on assembly plates 19, 20 enabling the length of the stall 4 to be adjusted to the size of the animal. This is of great significance in keeping the animal clean. The shoulder support is preferred but other types of forward restraining means may be used if desired. The forward bar section 9 extends up to and a little way in over the feeding table 6. A water container 13 is located on a vertical forward bar 12 of the forward section 9. The water container 13 is thus located immediately above the feeding table 6 and no water will therefore spill onto the floor of the stall. If the feeding table is sufficiently wide the forward section 9 can be extended even further, thus preventing the animals from reaching each others' fodder rations. The forward bar 12 is extended upwardly and backwardly to an upper part, the consecutive connecting bars supporting a horizontal bar 14 to stabilize the side stall partitions 7. This horizontal bar 14 can advantageously be used to support a water pipe 15 for the containers 13. The water pipe is easily mounted on the bar 14 with the aid of double U-clamps. The branches 16 from the water pipe 15 to the containers 13 are located in a protected position on top of the backwardly curved extension of the forward bar 12 and along the front edge of the vertical part of this forward bar.

The stall fittings also comprise a special means for confining and simultaneous releasing the animals belonging to one and the same group. A rear closing means is provided for each stall 4, elongate, upright guide means, e.g. vertical, in the form of bars 21 being secured to the rear bar section 10 of each side stall partition 7 and extending above this. Each bar 21 is provided with a sliding holder in the form of a sleeve 22 with one or two attachment rings (see FIG. 2) depending on the position of the side stall partition (outer or intermediate position). The holders may alternatively slide in tubular rods with slits. If desired the bars may be somewhat inclined rearwardly or curved so that the closing means will move away from the animal when the means is lifted. In the preferred embodiment illustrated, each closing means comprises a barrier in the form of a rope 23, one end secured by splicing, for instance, to the sleeve 22 of one of the side stall partitions 7 and the other end secured by a hook 24, for instance, to the sleeve 22 of the other side stall partition of the same stall 4. The rope 23 can then be freed manually from one of the sleeves to permit free access to the stall if desired, such as if an animal is to be moved from somewhere else to that particular stall place for inclusion in the group. The barriers 23 are thus loosely suspended between their attachment points on the sleeves 22 and generally consist of a flexible material or construction. Instead of such an unstretched or slack rope, an unstretched or slack wire, strip, chain or the like may be used, which offers the same desirable properties so that it will be flexible and bend and turn away when the cow is contacting it with her back.

The sleeves 22 and thus also the rope 23 can be automatically moved from a lower position shown in FIG. 2 in unbroken lines to an upper position shown in FIG. 2 in broken lines, and back again with the aid of a common manoeuvre means. The lower position of the sleeves 22 and thus the rope 23 is predetermined in relation to the stall floor 5 so that an animal standing in the stall cannot move back without feeling the rope. This is sufficient to restrain the animal without difficulty and it is therefore not tied by the neck or in any other manner. It can therefore move freely in its stall, but is unable to turn around since the distance between two side stall partitions 7 is small enough to prevent this. In this lower position, therefore, each rope 23 serves to close the stall 4. The upper position of the sleeves 22 and thus the rope 23 is sufficiently high to enable the animal to move without coming into contact with the rope when it is permitted to back out of its stall 4. In this position, therefore, the rope opens the stall. According to a preferred embodiment the ropes for all the animals in one group are set at a predetermined intermediate level in relation to the height of the animals when standing, such that an animal can enter the stall 4, the rope being deflected by its neck and spine sections, whereas once it is in the stall 4 the rope 23 is sufficiently low in this intermediate level to prevent the animal from backing out. This intermediate level of the rope, a little lower than the height of the rear end of the animal when standing, is sufficient to have the desired restraining effect while still allowing the rope to be pushed up out of the way as described above. This intermediate level is set after the animals have left their stalls 4. Upon returning from the milking parlor 2, for instance, they are able to enter their respective stalls 4 at leisure but once in, are unable to leave the stall 4. If, instead, the rope 23 were to be in its uppermost position, an animal could leave its stall 4 before all the animals in the group had entered theirs. The rope 23 is set automatically in the three positions, following a predetermined pattern, by means of the manoeuvre means described below.

When the barriers 23 are to be set in the intermediate level as described above, besides a lower closing level and an upper opening level, two pneumatic cylinders are preferably used for operation of the barriers. The cylinders are actuated one after the other, using the intermediate level as the limit for connecting and disconnecting the cylinders.

The vertical rods 21 support at their upper ends a horizontal U-profile 25, in the groove of which a pull rod 26 is displaceably journalled for movement fro and to. The U-profile stabilizes the side stall partitions 7. Each sleeve 22 is connected to the pull rod 26 by a line or wire 27 running over a nylon pulley 28 in the downwardly facing groove of the U-profile and secured to a ring 29 on the pull rod 26 and an eye 30 on the sleeve 22. The pulleys 28 also serve to support the pull rod 26. When the pull rod 26 is moved to the right in the embodiment shown in FIG. 2, the pull rod 26 will pull the lines 27 with it, and these will in turn raise the sleeves 22 and ropes 23 to the upper position, shown in broken lines. When the pull rod 26 is moved in the other direction the sleeves and ropes at once will move down due to their own weight.

Besides said lines 27 and pull rod 26, the manoeuvre means for automatically raising and lowering the ropes 23 also includes a power transmission means to actuate the pull rod 26. In the embodiment shown this consists of a pneumatic cylinder 31 attached on top of the U-profile 25. The cylinder 31 has a piston rod 32 with a downwardly directed arm 33 at its free end. The arm 33 extends through a longitudinal slit in the U-profile 25 and is secured to one end of the rod 26. The arm 33 on the piston rod 32 is provided with wheels 34 to prevent it from breaking the piston rod. The length of the slit in the U-profile 25 is adjusted to the length of the piston stroke. The cylinder 31 may also be arranged to serve a neighbouring group of animals, by connecting pull rod 26 of group G1 to pull rod 26 of group G2 in the same feeding and resting place, for instance.

The manoeuvre means described above thus constitutes part of a pneumatic system which automatically controls the opening of the rear of the stall and which is designed to operate in a flexible manner, i.e. without any damaging forces which might cause injury to equipment and animals should anything impede the movement. In the event of considerable counter-pressure the piston will stop in the cylinder 31 and only continue its movement when the obstacle has been removed. The pneumatic cylinders thus have small area and the pressure exerted on the cylinder is therefore easy to set by increasing or decreasing the pressure from the compressor serving the cylinders.

In the embodiment shown the bar sections 9 and 10 are welded to the post. According to another embodiment they are mounted to the post by means of screws. This makes it possible to more convenient build the stalls in stages, i.e. the forward bar sections are mounted in a first stage and later on the rear bar sections are mounted in a second stage. It is also advantageous to mount the horizontal bars of each bar section in horizontal sleeves of a unit which preferably is screwed onto the post. The horizontal bars are slidable in the sleeves and are fixed together in a desired position. This makes it possible to adjust the length of the side stall partition with respect to the length of the cows.

The stall fittings described above have been developed primarily for stall barns in which the cows eat and rest in one place but are milked in another place. With this system, to save labour it must be possible to open the stalls for a certain number of cows simultaneously in a simple manner. This is possible with the means according to the invention. Groups of cows are released in a predetermined sequence with the aid of pneumatic cylinders 31 which are remote-controlled from a central control station 35 in the milking parlor 2. Furthermore, each group of animals must be led to the milking parlor 2 along a predetermined route of a way system and back to the same stalls along the same or a different route of the way system. For this purpose the way sYstem, as illustrated in FIG. 1, comprises a plurality of automatically adjustable gates 42 to 65, arranged to be controlled by pneumatic cylinders (not shown) via an electrically actuated system with magnet valves and pressure switches having lamps to indicate which combination of gates has currently been selected and which group of cows and route have been selected. The groups of cows designated G1 to G16 have individual switches responsible for ensuring that all gates for a selected group are in the correct position to give free passage to the milking parlor 2 without the animals being diverted down side paths to the wrong place. The gates are indicated by unbroken lines indicating the starting position for each gate and by broken lines indicating the other position. The gates are hinged on the stall fittings and most of them are interconnected with the release of a particular group of cows in such a way that when the signal is given to open the stalls for a certain group of animals, a signal will be given simultaneously or shortly thereafter to move the relevant gates to the position indicated in broken lines. All gates can be swung aside to give free passage for personnel along all routes when milking is not in progress, for instance.

All functions for releasing groups of cows and changing the position of the gates are controlled from said central control station 35 in the milking parlor.

The milking parlor is duplicated to allow access for two separate groups of cows simultaneously in two separate milking stalls 36, 37. In this case the milking parlor contains two collection pens 38, 39, located in conjunction with the entry gates 40, 41 to the milking stalls.

The entire system for releasing cows and setting the gates can be controlled by means of a computer. The computer is programmed so that the groups of cows are taken to and from the milking parlor 2 in a predetermined order and is suitably activated by the entry gates 40, 41 to execute a new phase. Each new phase is initiated by releasing the next group of cows in accordance with the predetermined program. The control process can easily be altered to function even if a smaller number of animals is to be milked.

The system also facilitates releasing animals in groups to exercise pens outside the barn. Furthermore it entails increased safety in emergency situations. The building can be vacated more reliably and easily in the event of danger such as fire, via the emergency exits marked 0 in FIG. 1.

Thanks to the proposed stall construction, each side stall partition having only one connection with the foundation, there is no obstructing equipment by the feeding table or stall floor where dirt traps might form. At the same time a continuous, open, horizontal space is formed along the feeding table below the forward bar sections 9 and a continuous, open, horizontal space along the stall floor 5 below the rear bar sections 10. Free communication is thus formed in an advantageous manner between the feeding table and the forward and rear areas of the stall floor, which is divided by the posts 8.

The barriers 23 described are so thin that excretion from the cows does not fall on them. The cows can thus keep cleaner. The barriers 23 do not form rigid connections, but are to a certain extent flexible due to their hanging attachment and material properties. They are also movable or twistable at their attachment points. Tension is therefore considerably reduced, ensuring good function over a very long period of time. If desired, the barriers may consist of an elastic material or they may be secured by suitable spring means. Besides the advantages mentioned above, the invention paves the way for highly rational milk production when keeping cattle in barns with feeding and resting places where each animal is kept during rest and feeding in a separate stall and taken to a separate milking parlor in the manner described above. When a new stall barn is to be built, this enables a considerably reducing in the area required for a certain number of dairy cows as compared with a system using non-tied cows in a loose operation. A considerably greater number of dairy cows can be accommodated upon a changeover from loose operation to operation in accordance with the present method. The method can be applied in a conventional stall barn if the building is provided with a separate milking parlor. It is thus an additional advantage that the method and means according to the invention can be utilized in a simple manner in already existing buildings. It also enables easy use of outdoor exercise pens, allowing the animals to exercise every day. Both the daily walk to and from the milking parlor, usually twice a day, and facilitated exercising of the animals entail great advantages with respect to the well-being of the animals, taking into consideration the serious problems arising with animals tied up all the day and often all the year round. In the event of a disaster, such as a fire, the invention enables rapid vacation of the barn, emergency routes of the way system being opened and the animals released in an automatically controlled manner. This can even be initiated by a signal from a suitable fire alarm. Furthermore, the high degree of automization also means that the number of animals in each group can be kept desirably small. Milking can be conveniently carried out and the animals can be treated individually with respect to fodder, care and supervision. Another advantage is that the slatted floors along the herding routes can be avoided, reducing building costs. It will be understood that when a group of animals is to be released they will immediately react to the noise of the closing means being raised and will start backing out of the opened stalls. This effect cannot be utilized in loose operation systems since the animals are not closed in individually.

That which is claimed is:

1. An arrangement for keeping cattle in a stall barn having feeding and resting places, wherein each animal is maintained, during feeding and resting, in a separate stall defined by at least vertical parallel side stall partitions, said animals being divided into a plurality of individual groups having a predetermined number of animals in each group, the groups being distributed along said feeding and resting places, the arrangement comprising closing means for confining the animals in individual stalls, a plurality of gates and power transmission means for said gates for establishing predetermined routes of a way system for the animals to and from a specific collecting place at a distance from said feeding and resting places, said closing means being at the rear of the stalls behind each animal within each group and being adapted to be raised and lowered simultaneously by an individual power transmision means, and a common control station having control means for automatically controlling the power transmission means for said gates and said closing means, said control means being effective to actuate the power transmission means for the closing means in a predetermined sequence, depending on the group of animals selected, and at the same time actuating the power transmission means for the gates to establish a predetermined route of said way system for the group selected, said closing means for each stall comprising a flexible barrier operatively connected at the rear of said stalls and having a length greater than the distance between connecting points of said barrier to the vertical side stall partitions, said barrier being connected at the rear of the stalls by having its opposed ends connected to sleeves slidable along guide means comprising vertical bars mounted at the rear end of said side stall partitions, said bars for a group of animals supporting a common horizontal groove element having a pull rod movably mounted therein, said pull rod being operatively connected to each sleeve and mounted for longitudinal movement in said grooved element for raising and lowering the barrier for each stall under control of said individual power transmission means, whereby said arrangement is free of pivotally journalled means for raising and lowering the barriers.

2. The arrangement of claim 1, wherein each side stall partition comprises a vertical support post as its only connection with the foundation, said post being arranged on the stall floor at some distance from the feeding table said side stall partitions at its forward end being provided with shoulder supports inclined forwardly and downward to conform to the shape of the animal.

3. An arrangement for keeping cattle in a stall barn, comprising feeding and resting places where each animal is maintained during feeding and reting in separate stalls, each defined by at least vertical parallel side stall partitions, forward shoulder supports at a forward part of each stall and rear closing means for each stall for confining an animal in its stall, a power transmission means operatively connected with said closing means for opening and closing a predetermined number of adjacent sequential stalls for a given group of animals of given number, parallel guide means secured to the rear ends of said side stall partitions and extending upwardly therefrom, a holder movably mounted on each guide means for movement up and down on the guide means, said closing means for each stall comprising a flexible barrier having a length greater than the distance between said two holders so as to be suspended therebetween, each stall barriers of said predetermind number of stalls being raised and lowered simultaneously by said power transmission means.

4. The arrangement of claim 3, wherein said guide means comprise bars, the upper ends of which support a common horizontal grooved element having a pull rod movably mounted therein, said pull rod being operatively connected to each holder of a group of stalls and being movable to and fro in said grooved element to raise and lower said barriers on operation of said power transmission means.

5. The arrangement of claim 4, wherein said power transmission means comprises at least a pneumatic cylinder which is rigidly mounted on said profile grooved element.

6. The arrangement of claim 3, wherein each barrier is selected from the group consisting of an unstretched loose rope, line, strip and chain.

7. The arrangement of claim 3, wherein said holder comprises as sleeve slidably mounted on said guide means.

8. The arrangement of claim 3, wherein said barriers are mounted on side stall partitions, each comprising a vertical support post as its only connection with the foundation, said post being arranged on a floor of the stall substantially in the middle of the stall floor with respect to the feeding table, said side stall partitions supporting shoulder supports which are inclined forwardly and downward to fit the animal body shape, and being interconnected by means of a horizontal bar stabilizing the side stall partitions.

9. The arrangement of claim 3, wherein said barriers are positionable to an intermediate position sufficiently high to permit an animal to gain access to its stall and yet sufficiently low to prevent the animal from backing out once in the stall.

10. The arrangement of claim 9, wherein said intermediate position is the limit for connecting and disconnecting the power transmission means.

11. The arrangement of claim 3, wherein said power transmission means is energized and deenergized by control means of a control station in a milking parlor.

12. The arrangement of claim 8, wherein each side stall partition comprises horizontal forward and rear bar sections adjustable mounted to said post in sleeves to permit adjustment of the length of the stall to accommodate the length of an animal.

* * * * *